(12) United States Patent
Griffey et al.

(10) Patent No.: US 6,303,247 B1
(45) Date of Patent: Oct. 16, 2001

(54) BATTERY COVER HAVING RECESSED ATTACHMENT FEATURE

(75) Inventors: Tammy M. Griffey, Fishers; Dane E. Carter, Noblesville, both of IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/493,945

(22) Filed: Jan. 28, 2000

(51) Int. Cl.[7] .............................. H01M 2/04; H01M 2/06; H01M 2/10
(52) U.S. Cl. .......................... 429/175; 429/163; 429/187
(58) Field of Search ................. 429/7, 163, 175, 429/187

(56) References Cited

U.S. PATENT DOCUMENTS

| | | | |
|---|---|---|---|
| 4,562,125 | * | 12/1985 | Davis ........................... 429/65 |
| 4,861,687 | * | 8/1989 | Brantley et al. .................. 429/187 |
| 5,624,772 | * | 4/1997 | McVey et al. .................... 429/187 |
| 5,691,076 | * | 11/1997 | Poe ................................. 429/53 |
| 5,804,770 | * | 9/1998 | Tanaka ......................... 174/138 F |
| 6,124,055 | * | 9/2000 | Stocchiero ....................... 429/65 |
| 6,153,329 | * | 11/2000 | Raschilla et al. .................. 429/65 |

* cited by examiner

Primary Examiner—Gabrielle Brouillette
Assistant Examiner—Tracy Dove
(74) Attorney, Agent, or Firm—Margaret A. Dobrowitsky

(57) ABSTRACT

An electric storage battery includes a case for housing the battery's active, energy-storage elements, and a cover. The cover is configured to be secured to the case to thereby enclose the active elements. The cover includes one or more blind bores having a deformation relief feature on an inner surface thereof so as to configure the blind bore to receive a fastener for mounting a component to the battery. The deformation relief feature includes a plurality of ribs separated by intervening grooves.

8 Claims, 2 Drawing Sheets

BATTERY COVER HAVING RECESSED ATTACHMENT FEATURE

BACKGROUND OF THE INVENTION

1. Technical Field

The invention relates to electric storage batteries generally, and, more particularly, to a cover portion thereof having a recessed attachment feature.

2. Description of the Related Art

It is often desirable to mount a component, such as an electronics module, in the engine compartment of an automotive vehicle. Conventionally, such components are attached using a separate bracket or the like. The separate bracket, however, generally increases the cost of the automotive vehicle and takes up space.

It is also known to provide an electric storage battery generally, and in particular one that includes an attachment hole for a terminal protector. For example, U.S. Pat. No. 5,691,076 issued to Poe discloses an electric storage battery that includes a case or housing the battery's active elements, wherein the case includes a base, a pair of opposing ends and a pair of opposing sides. Poe further discloses a battery cover secured to the case. Poe, however, does not disclose any features for mounting or securing components co the battery.

The other electric storage battery configuration referred to above includes a cylindrical recess adapted to receive a corresponding post of a so-called terminal protector for positioning and securing the terminal protector. Terminal protectors are known generally, as seen by reference to U.S. Pat. No. 4,562,125 issued to Davis. The cylindrical recesses, however, provide only a limited attachment mechanism, suitable only for the terminal protector for which it was designed. That is, the cylindrical recesses referred to above are not suitable, generally, for use in mounting other components that may be found in the engine compartment of an automotive vehicle. Moreover, even were the terminal protector referred to above not used, thus making the cylindrical recesses available for alternate mounting purposes, the basic cylindrical recesses are not very robust in terms of allowing components to be secured to the battery. Use of fasteners in these recesses may cause the recess wall to crack or split, compromising the seal established between the inside of the battery (e.g., electrolytes) and atmosphere.

According, there is a need to provide an electric storage battery that minimizes or eliminates one or more of the problems or shortcomings set forth above.

SUMMARY OF THE INVENTION

An electric storage battery according to the present invention not only provides a conventional power-providing function, but, additionally, has an advantage of providing an attachment feature through which components destined for use in an engine compartment may be secured. Integration of such a mounting feature eliminates the need for a separate bracket or the like. In addition, the attachment feature is sufficiently robust to allow heavy components to be secured to the battery, using off-the-shelf fasteners.

According to the invention, a cover for an electric storage battery is provided. The storage battery is of the type that includes a case for housing the battery's active elements, and which includes a base, a pair of opposing ends and a pair of opposing sides. The cover is configured to be attached to the case to enclose the active elements in the case, characterized in that: the cover includes a blind bore having a deformation relief feature on an inner surface thereof so as to configure the blind bore to receive a fastener for mounting a component to the battery.

In a preferred embodiment, the blind bore is disposed along a longitudinal axis, and the deformation relief feature includes a plurality of longitudinally (i.e., vertically) extending, circumferentially-spaced ribs separated by intervening grooves. Through the foregoing, a conventional fastener, such as a threaded-type fastener, may be employed to secure a component to the battery. The deformation relief feature enhances the holding ability of the fastener to the inner wall of the blind bore as well as reduces the likelihood of cracks or the like during use.

BRIEF DESCRIPTION OF THE DRAWINGS

The present invention will now be described by way of example, with reference to the accompany drawings, in which.

DETAILED DESCRIPTION OF THE PREFFERED EMBODIMENTS

Figure 1:
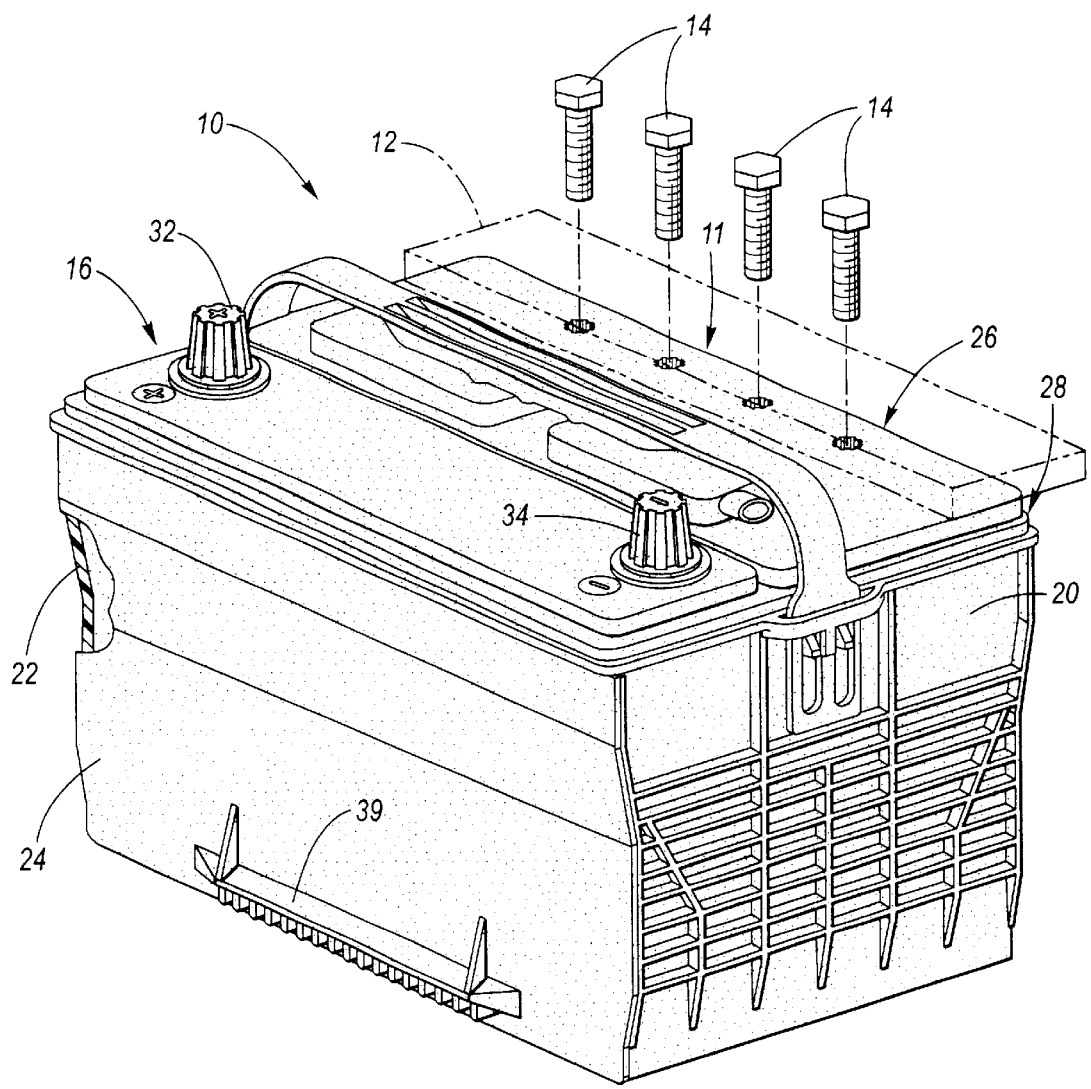
FIG. 1 is a simplified, exploded perspective view of an electric storage battery having a cover in accordance with the present invention.

Referring now to the drawings wherein like reference numerals are used to identify identical components in the various views, FIG. 1 is an exploded, perspective view of an electric storage battery 10 having an attachment feature 11 for securing a component 12 to battery 10 through the use of one or more fasteners 14. Battery 10 may be employed in a variety of environments, such as in an engine compartment of an automotive vehicle (not shown). Component 12 (shown in phantom line) may comprise an automotive-specific component, such as a control module/electronics unit, or a bussed, electrical connector assembly (i.e., containing fuses and/or relays) or the like. Alternatively, component 12 may comprise a component not traditionally considered automotive, such as, in a constructed embodiment, an alternating current (AC) power converter (i.e., a so-called "inverter") for providing AC power for portable AC-operated apparatus, such as entertainment items like a television.

Fasteners 14 may comprise conventional, off-the-shelf fasteners. For example, fasteners 14 may comprise a threaded type fastener, such as a tapping screw. In an alternate embodiment, for "tool-less" installation of component 12, an interference fit-type fastener 14 may be used (e.g., a "push-pin" fastener that expands at the base after insertion and which bears upon the wall of the recess).

Battery 10 includes a case 16 having a base 18, a pair of opposing ends 20, 22 and a pair of opposing sides 24, 26, a cover 28, active energy-storage elements 30, a positive polarity terminal 32, and a negative polarity terminal 34. Battery 10 may further include a handle 36, and a venting apparatus 38, as known in the art.

Case 16 is provided generally for housing battery 10's active elements 30. Case 16 may comprise conventional materials and construction, as known to those of ordinary skill in the art. For example, case 16 may comprise polypropylene material. In addition, case 16 may itself include features for mounting the battery 10 in and to the engine compartment, such as ledge 39 against which a bracket may bear.

Battery cover 28 is configured in size and shape to be secured to enclose a top opening of case 16. Active elements 30 store and provide power via connections to terminals 32, 34. Elements 30 may be a part of a conventional lead acid configuration, the illustration of the acid (i.e., electrolyte) being omitted for clarity. Other chemistries are contemplated for use in battery 10. Case 16, cover 28, active elements 30, and terminals 32,34 are known, generally, to those of ordinary skill in the art as seen by reference to U.S. Pat. No. 5,691,076 entitled "LEAK PROOF VENTING SYSTEM FOR ELECTRIC STORAGE BATTERY", hereby incorporated in its entirety by reference.

Figure 2:
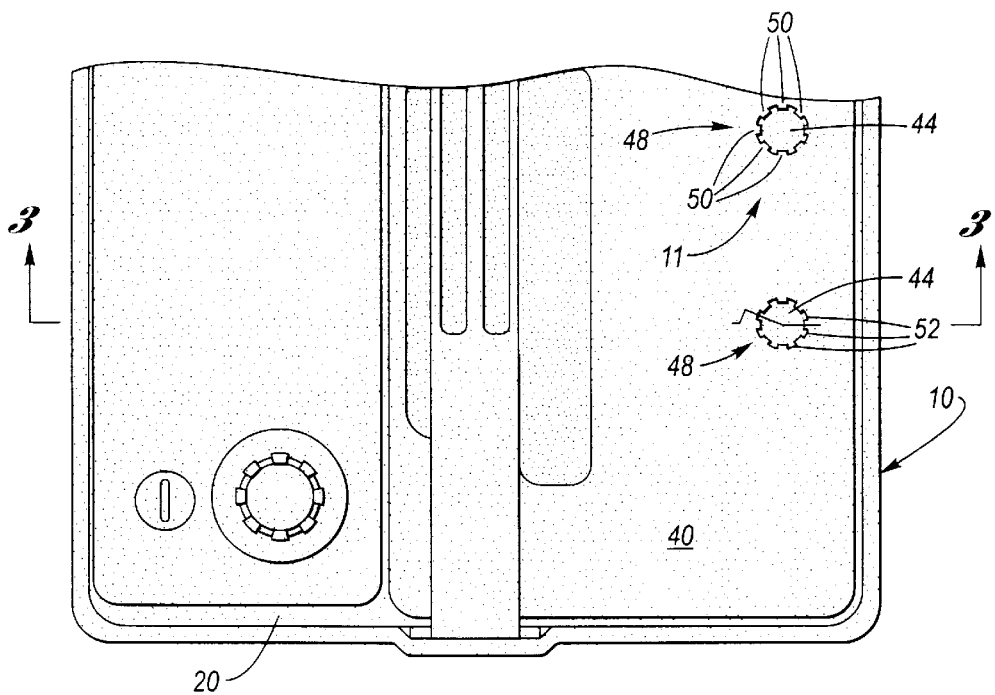
FIG. 2 is a simplified, top plan view of the battery cover of FIG. 1 showing, in greater detail, a plurality of blind bores.
Figure 3:
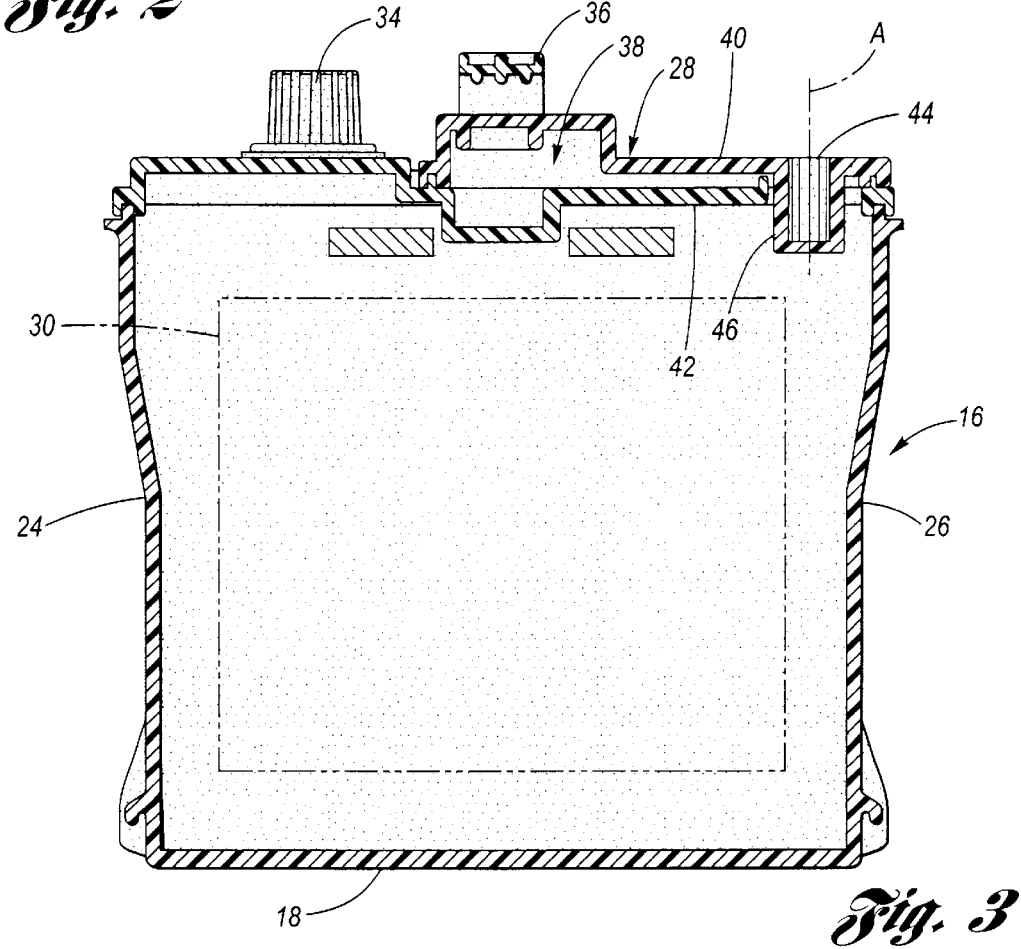
FIG. 3 is a simplified section view, taken substantially along lines 3—3 in FIG. 2, particularly showing the inventive battery cover including a blind bore configured to receive a fastener.

Referring now to FIGS. 2 and 3, battery cover 28 includes an outer surface 40 (best shown in FIG. 2) and an inner surface 42 (best shown in FIG. 3) that is opposite therefrom.

In accordance with the present invention, recessed attachment feature 11 includes at least one, and preferably, a plurality of blind bores 44 formed in battery cover 28. Each bore 44 is disposed along a respective longitudinal axis, designated "A" in the drawings. Blind bore 44 is defined by a generally cylindrical wall 46 projecting inward from inner surface 42 of cover 28. Wall 46 defines the sides, and a bottom end that isolate blind bore 44 from an interior volume of battery 10.

Blind bore 44 includes a deformation relief feature 48 on an inner surface thereof so as to configure blind bore 44 to receive fastener 14 for mounting component 12 to battery 10. In the context of the present invention, the term blind bore or hole means a bore that does not pass completely through the workpiece (i.e., the battery cover 28). This characteristic maintains the seal established generally by cover 28 that prevents uncontrolled venting of gases out of the interior volume of battery 10. Although shown as having a generally circular geometry, other geometries are contemplated, such as elliptical, square, etc., to meet the requirements of the particular fastener contemplated for use therewith. Preferably, however, the blind bore 44 is generally circular in shape.

As shown particularly in FIG. 2, deformation relief feature 48 comprises, in one embodiment, a plurality of vertically-extending (i.e., longitudinally extending relative to axis "A"), circumferencially-spaced ribs 50 separated by a corresponding plurality of intervening grooves 52. In operation, the threads of fastener 14 dig into ribs 50 to provide enhanced holding capacity. The grooves 52 allow deformation of the ribs 50, thus minimizing cracking. In the illustrated embodiments, each blind bore 44 includes eight circumferentially spaced ribs 50 separated by eight grooves 52. It should be understood, however, that other configurations may be used (e.g., different numbers), depending upon the type of fastener 14 contemplated for use in connection the blind bores.

The present invention eliminates the need for a separate bracket or the like to mount a component, such as an electronics module, in an engine compartment of an automotive vehicle. In addition, the deformation relief feature 48 of each blind bore provides a robust attachment mechanism, conveniently implemented by use of conventional fasteners.

In one embodiment, battery cover 28 comprises polypropylene material, wherein wall 46 is approximately 3 millimeters(mm) thick, and grooves 52 are approximately 0.70 millimeters (mm) deep. The foregoing dimensions were selected based on the contemplated use of a conventional tapping screw, 7/16" in length.

It should be understood that although blind bore 44, in an Illustrated embodiment, is substantially perpendicular to outer surface 40 of cover 28, slight variations in orientation are possible, depending on the requirements of component 12. Moreover, it should be further understood that although blind bore 44 is defined by wall 46 that projects inwardly from inner surface 42 into an interior volume of battery 10, other arrangements are possible such as, for example, projection above outer surface 40, and/or both projection above surface 40 and below surface 42.

It Is to be understood that the above-description is merely exemplary rather than limiting nature, the invention being limited only by the appended claims. Various modifications and changes may be made thereto by one of ordinary skill in the art which embodies the principles of the invention and fall within the sprit and scope thereof.

We claim:

1. A battery cover for an electric storage battery wherein the battery includes a case for housing the battery active elements, the case having a base, a pair of opposing ends and a pair of opposing sides, the cover being configured to enclose the active elements in the case, the cover includes a blind bore having a deformation relief feature on a surface within the bore so as to configure the blind bore to receive a fastener for mounting a component to the battery, wherein the blind bore is disposed along a longitudinal axis, and the deformation relief feature includes a plurality of longitudinally-extending, circumferentially-spaced ribs separated by grooves.

2. The battery cover of claim 1 wherein the fastener is one of a threaded fastener or an interference fit fastener.

3. The battery cover of claim 1 wherein the blind bore is disposed along a longitudinal axis that is substantially perpendicular to the cover.

4. The battery cover of claim 3 wherein the blind bore is defined by a generally cylindrical wall.

5. An electric storage battery including a case for housing the battery active elements having a base, a pair of opposing ends and a pair of opposing sides, the battery further including a cover configured to cooperate with the case for enclosing the active elements, the cover includes a blind bore having a deformation relief feature on a surface within the bore so as to configure the blind bore to receive a fastener for mounting a component to the battery, wherein the blind bore is disposed along a longitudinal axis, and the deformation relief feature includes a plurality of longitudinally-extending, circumferentially-spaced ribs separated by grooves.

6. The battery of claim 5 wherein the fastener is one of a threaded fastener or an interference fit fastener.

7. The battery of claim 5 wherein the blind bore is disposed along a longitudinal axis that is substantially perpendicular to an outer surface of the cover.

8. The battery of claim 7 wherein the blind bore is defined by a generally cylindrical wall.

* * * * *